US012604901B2

(12) United States Patent
Rabnawaz et al.

(10) Patent No.: US 12,604,901 B2
(45) Date of Patent: Apr. 21, 2026

(54) ANTIMICROBIAL PLASTICS AND METHODS OF PREPARING THE SAME

(71) Applicant: Board of Trustees of Michigan State University, East Lansing, MI (US)

(72) Inventors: Muhammad Rabnawaz, East Lansing, MI (US); Saleh Alkarri, Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 176 days.

(21) Appl. No.: 18/421,216

(22) Filed: Jan. 24, 2024

(65) Prior Publication Data

US 2024/0245054 A1 Jul. 25, 2024

Related U.S. Application Data

(60) Provisional application No. 63/440,982, filed on Jan. 25, 2023.

(51) Int. Cl.
| | |
|---|---|
| *A01N 59/20* | (2006.01) |
| *A01N 59/06* | (2006.01) |
| *B29C 45/00* | (2006.01) |
| *B29C 48/00* | (2019.01) |
| *B29C 59/00* | (2006.01) |
| *B29K 23/00* | (2006.01) |
| *B29K 105/00* | (2006.01) |
| *B29K 509/00* | (2006.01) |

(52) U.S. Cl.
CPC ............. *A01N 59/20* (2013.01); *A01N 59/06* (2013.01); *B29C 45/0001* (2013.01); *B29C 48/022* (2019.02); *B29C 59/005* (2013.01); *B29K 2023/12* (2013.01); *B29K 2105/0035* (2013.01); *B29K 2509/00* (2013.01)

(58) Field of Classification Search
CPC ...... B29C 41/12; B29C 59/005; B29C 48/022
See application file for complete search history.

(56) References Cited

U.S. PATENT DOCUMENTS

| | | | |
|---|---|---|---|
| 2002/0051754 A1* | 5/2002 | Schroeder | B65D 65/38 424/54 |
| 2005/0112339 A1* | 5/2005 | Sandel | A01N 43/40 428/206 |

FOREIGN PATENT DOCUMENTS

| | | | |
|---|---|---|---|
| CN | 115044096 | * | 9/2022 |

* cited by examiner

*Primary Examiner* — Stella K Yi
(74) *Attorney, Agent, or Firm* — Harness, Dickey & Pierce, P.L.C.

(57) ABSTRACT

A method for preparing the antimicrobial plastic includes contacting a non-leachable antimicrobial agent to a surface of a plastic article to form the antimicrobial plastic. In certain variations, the contacting includes applying a precursor antimicrobial layer including non-leachable antimicrobial agents to a surface of a plastic article to form a precursor assembly and hot pressing the precursor assembly to embed the non-leachable antimicrobial agents within the surface of the plastic article to form the antimicrobial plastic. In other variations, the contacting includes preparing an antimicrobial layer including a non-leachable antimicrobial agent on a foil and transferring the antimicrobial layer from the foil to the surface of the plastic article to form the antimicrobial plastic, where the transferring includes contacting the antimicrobial layer and the surface of the plastic article and applying a transfer temperature that is greater than a softening temperature of the plastic article.

19 Claims, 7 Drawing Sheets

300

500

510

520

530

540

ANTIMICROBIAL PLASTICS AND METHODS OF PREPARING THE SAME

FIELD

This application claims the benefit of U.S. Provisional Application No. 63/440,982 filed Jan. 25, 2023. The entire disclosure of the above application is incorporated hereby by reference.

FIELD

The present disclosure relates to moldable, extrudable, or thermoformable plastics having antimicrobial characteristics and to methods of preparing the same.

BACKGROUND

This section provides background information related to the present disclosure which is not necessarily prior art.

Infectious diseases often spread by contact with contaminated surfaces, and the demand for surfaces antimicrobial characteristics continues to rise in view of ongoing global pandemics. Some plastics can be engineered to have certain antimicrobial moieties, such as cationic polyethylene glycol, poly(ethylene imine), and poly(2-(tert-butyl aminoethyl) methacrylate). However, these plastics are often not suitable for structural uses. For example, these polymers may be water soluble or water swellable. For inert moldable, extrudable, or thermoformable plastics, the incorporation of certain inorganic crystal biocides, like $CuCl_2 \cdot 2H_2O$, has been tried. However, such leachable antimicrobial agents, which release metal ions that destroy bacteria, are often toxic to human cells and cannot be used for food or health care packaging. The incorporation of antimicrobial nanoparticles, like nano silver and nano copper particles, with inert plastics (like polyamic 6 and/or poly(methyl methacrylate)) and/or with polymers having inherent biocidal activity, such as cationic poly(2-(tert-butyl aminoethyl) methacrylate), have also been tried. However, silver and copper metal nanoparticles often leach ions which damage cells and as such cannot be used in high concentrations for food or health care packaging. Non-leaching, antimicrobial agents, such as $Mg(OH)_2$ are classified as non-toxic to human cells and should be able to be used in food or health care packaging. However, such non-leaching, antimicrobial agents often require direct contact with microbes making the incorporating of useable non-leaching, antimicrobial agents in moldable, extrudable, or thermoformable plastics difficult. Accordingly, it would be desirable to develop moldable, extrudable, or thermoformable plastics that include useable antimicrobial agents (i.e., those useable for food or health care packaging) and methods of forming the same.

SUMMARY

This section provides a general summary of the disclosure and is not a comprehensive disclosure of its full scope or all of its features.

In various aspects, the present disclosure provides a method for preparing an antimicrobial plastic.

In at least one example embodiment, the method includes contacting a non-leachable antimicrobial agent to a surface of a plastic article to form the antimicrobial plastic.

In at least one example embodiment, the method further includes, before the contacting of the non-leachable antimicrobial agent to the surface, pre-treating the surface of the plastic article to improve wettability of the plastic article.

In at least one example embodiment, the pre-treating of the surface of the plastic article includes a plasma treatment.

In at least one example embodiment, the contacting of the non-leachable antimicrobial agent to the surface includes applying precursor antimicrobial layer to the surface of the plastic article forming a precursor assembly and hot pressing the precursor assembly to embed the non-leachable antimicrobial agents within the surface of the plastic article to form the antimicrobial plastic.

In at least one example embodiment, the hot pressing includes applying heat at a temperature greater than or equal to about 5° C. to less than or equal to about 100° C. above a glass transition temperature of the plastic article when the plastic articles includes fully amorphous polymers and applying pressure greater than or equal to about 0.5 bars to less than or equal to about 5 bars.

In at least one example embodiment, the hot pressing includes applying heat at a temperature above a glass transition temperature of the plastic article and about 5° C. below a melting temperature when the plastic articles includes semicrystalline polymers and applying pressure greater than or equal to about 0.5 bars to less than or equal to about 5 bars.

In at least one example embodiment, the method further includes drying the precursor antimicrobial layer before the hot pressing, where the drying includes heating the precursor antimicrobial layer to a drying temperature greater than or equal to about 30° C. to less than or equal to about 100° C.

In at least one example embodiment, the contacting of the non-leachable antimicrobial agent to the surface includes spray coating, dip coating, metallic rod coating, dry coating, and any combination thereof.

In at least one example embodiment, the contacting of the non-leachable antimicrobial agent includes preparing an antimicrobial layer including the non-leachable antimicrobial agent and transferring the antimicrobial layer to the surface of the plastic article to form the antimicrobial plastic, where the transferring including contacting the antimicrobial layer and the surface of the plastic article and applying a transfer temperature that is greater than a softening temperature of the plastic article.

In at least one example embodiment, the preparing of the antimicrobial layer includes contacting the non-leachable antimicrobial agent to a solvent to form a slurry and disposing the slurry on a surface of a foil to form the antimicrobial layer.

In at least one example embodiment, the preparing of the antimicrobial layer further includes drying the antimicrobial layer, where the drying includes heating the precursor antimicrobial layer to a drying temperature greater than or equal to about 30° C. to less than or equal to about 100° C.

In at least one example embodiment, the preparing of the antimicrobial layer further includes cooling the antimicrobial layer to ambient temperature after the drying and before the transferring to the surface of the plastic article.

In at least one example embodiment, the transferring further includes applying a pressure greater than or equal to about 0.5 bars to less than or equal to about 5 bars.

In at least one example embodiment, the non-leachable antimicrobial agent includes magnesium hydroxide ($Mg(OH)_2$), magnesium oxide (MgO), magnesium-copper combinations, and any combination thereof.

In at least one example embodiment, the plastic article includes polypropylene (PP), linear polyethylene (PE), branched polyethylene (PE), polycarbonate (PC), polyethylene terephthalate (PET), polyvinyl chloride (PVC), polystyrene (PS), polyurethanes, polyacrylonitrile, and any combination thereof.

In at least one example embodiment, the non-leachable antimicrobial agent is part of a mixture, the mixture is contacted to the surface of the plastic article, and the mixture further includes a leachable antimicrobial agent, where the leachable antimicrobial agent includes silver (Ag), copper (Cu), copper (II) chloride dihydrate ($CuCl_2 \cdot 2H_2O$), zinc oxide (ZnO), calcium oxide (CaO), iron (Fe), and any combination thereof.

In various aspects, the present disclosure provides a method for preparing an antimicrobial plastic.

In at least one example embodiment, the method includes applying a precursor antimicrobial layer including non-leachable antimicrobial agents to a surface of a plastic article to form a precursor assembly and hot pressing the precursor assembly to embed the non-leachable antimicrobial agents within the surface of the plastic article to form the antimicrobial plastic. The non-leachable antimicrobial agent including magnesium hydroxide ($Mg(OH)_2$), magnesium oxide (MgO), magnesium-copper combinations, and any combination thereof.

In at least one example embodiment, the method further includes pre-treating the surface of the plastic article to improve wettability of the plastic article.

In at least one example embodiment, the precursor antimicrobial layer further includes a leachable antimicrobial agent, the leachable antimicrobial agent including silver (Ag), copper (Cu), copper (II) chloride dihydrate ($CuCl_2 \cdot 2H_2O$), zinc oxide (ZnO), calcium oxide (CaO), iron (Fe), and any combination thereof.

In various aspects, the present disclosure provides a method for preparing an antimicrobial plastic.

In at least one example embodiment, the method includes preparing an antimicrobial layer including a non-leachable antimicrobial agent on a foil, and transferring the antimicrobial layer from the foil to the surface of the plastic article to form the antimicrobial plastic, where the transferring includes contacting the antimicrobial layer and the surface of the plastic article and applying a transfer temperature that is greater than a softening temperature of the plastic article.

In at least one example embodiment, the non-leachable antimicrobial agent includes magnesium hydroxide ($Mg(OH)_2$), magnesium oxide (MgO), magnesium-copper combinations, and any combination thereof, and the antimicrobial layer further includes a leachable antimicrobial agent, where the leachable antimicrobial agent includes silver (Ag), copper (Cu), copper (II) chloride dihydrate ($CuCl_2 \cdot 2H_2O$), zinc oxide (ZnO), calcium oxide (CaO), iron (Fe), and any combination thereof.

In various aspects, the present disclosure provides an antimicrobial plastic.

In at least one example embodiment, the antimicrobial plastic includes a continuous layer that includes a plastic material or article and a layer that includes a plurality of antimicrobial nanomaterials disposed on one or more surfaces of the plastic material or article. The layer may cover greater than or equal to about 10% of a total surface area of the one or more surfaces of the plastic material or article. The plurality of antimicrobial nanomaterials may include non-leachable antimicrobial agents, leachable antimicrobial agents, or a combination thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
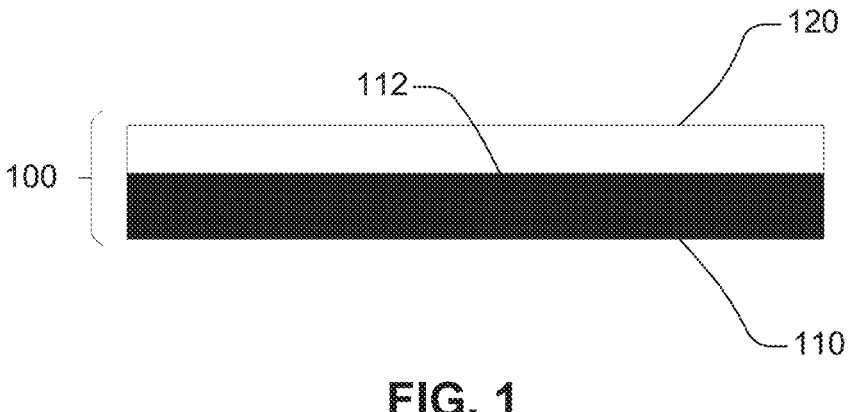
FIG. 1 is a cross-sectional illustration of an example antimicrobial plastic prepared in accordance with at least one example embodiment of the present disclosure.

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers, and/or sections, these elements, components, regions, layers, and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Various components are referred to herein as "operably associated." As used herein, "operably associated" refers to components that are linked together in operable fashion and encompasses embodiments in which components are linked directly, as well as embodiments in which additional components are placed between the linked components. "Operably associated" components can be "fluidly associated." "Fluidly associated" refers to components that are linked together such that fluid can be transported between them. "Fluidly associated" encompasses embodiments in which additional components are disposed between the two fluidly associated components, as well as components that are directly connected. Fluidly associated components can include components that do not contact fluid but contact other components to manipulate the system (e.g., a peristaltic pump that pumps fluids through flexible tubing by compressing the exterior of the tube).

Example embodiments will now be described more fully with reference to the accompanying drawings.

In various aspects, the present disclosure provides moldable, extrudable, or thermoformable plastics having antimicrobial characteristics. For example, the moldable, extrudable, or thermoformable plastics may include surface embedded antimicrobial agents and/or surface coated antimicrobial agents. For example, in certain variations, as illustrated in FIG. 1, an antimicrobial plastic 100 may include a first layer (or section or portion) 110 comprising a plastic material that includes, for example, thermoplastic materials such as polypropylene (PP), linear or branched polyethylene (PE), polycarbonate (PC), polyethylene terephthalate (PET), polyvinyl chloride (PVC), polystyrene (PS), polyurethanes, polyacrylonitrile, and blends and copolymers thereof, including, for example, polypropylene-co-polyethylene and/or acrylonitrile butadiene styrene (ABS). The plastic material may be pigmented to non-pigment and may similarly include foaming and non-foaming plastics. Although the first layer 110 is illustrated as a single layer, it should be appreciated that, in other example embodiments, the first layer 110 may be a multilayer layer (or section or portion) including one or more layers that are themselves continuous or discontinuous.

The antimicrobial plastic 100 may also include a second layer (or section or portion) 120 that includes an antimicrobial agent disposed on or near a first surface 112 of the first layer 110. Although illustrated as a continuous layer, it should be recognized that, in certain variations, the second layer 120 may be continuous or discontinuous layer having a random or organized pattern. For example, the second layer 120 may cover greater than or equal to about 10 vol. % to less than or equal to about 100 vol. %, optionally greater than or equal to about 50 vol. % to less than or equal to about 100 vol. %, and in certain aspects, optionally greater than or equal to about 80 vol. % to less than or equal to about 100 vol. %, of a total surface area of the first surface 112 of the first layer 110. Similarly, although illustrated as a single layer on a single surface, it should be recognized that, in certain variations, the second layer (or section or portion) 120 may be a multilayer layer including one or more layers that are themselves continuous or discontinuous and/or may be disposed on one or more other surfaces of the first layer 110.

The antimicrobial agent may include, for example, leachable antimicrobial agents, non-leachable antimicrobial agents, or a combination of leachable antimicrobial agents and/or non-leachable antimicrobial agents. The leachable antimicrobial agents and/or the non-leachable antimicrobial agents may include one or more pluralities of nanomaterials (e.g. nanocrystals) having antimicrobial characteristics. The leachable antimicrobial agents and the non-leachable antimicrobial agents differ in that the leachable antimicrobial agents require may provide antimicrobial benefits without directly contacting a microbial, whereas to provide antimicrobial benefits the non-leachable antimicrobial agents require direct contact with the microbial. The leachable antimicrobial agents may include, for example, silver (Ag), copper (Cu), copper (II) chloride dihydrate ($CuCl_2 \cdot 2H_2O$), zinc oxide (ZnO), calcium oxide (CaO), iron (Fe), and any combination thereof. The non-leachable antimicrobial agents may include, for example, magnesium hydroxide ($Mg(OH)_2$), magnesium oxide (MgO), magnesium-copper combinations, and any combination thereof. In certain variations, the first layer 100 may also include, in addition to the plastic material, a leachable antimicrobial agent. The leachable antimicrobial agent as included in the first layer 110 may be the same as or different from the leachable antimicrobial agent as included in the second layer 120.

Figure 2A:
FIG. 2A is a microscopic image illustrating an example antimicrobial plastic prepared in accordance with at least one example embodiment of the present disclosure.
Figure 2B:
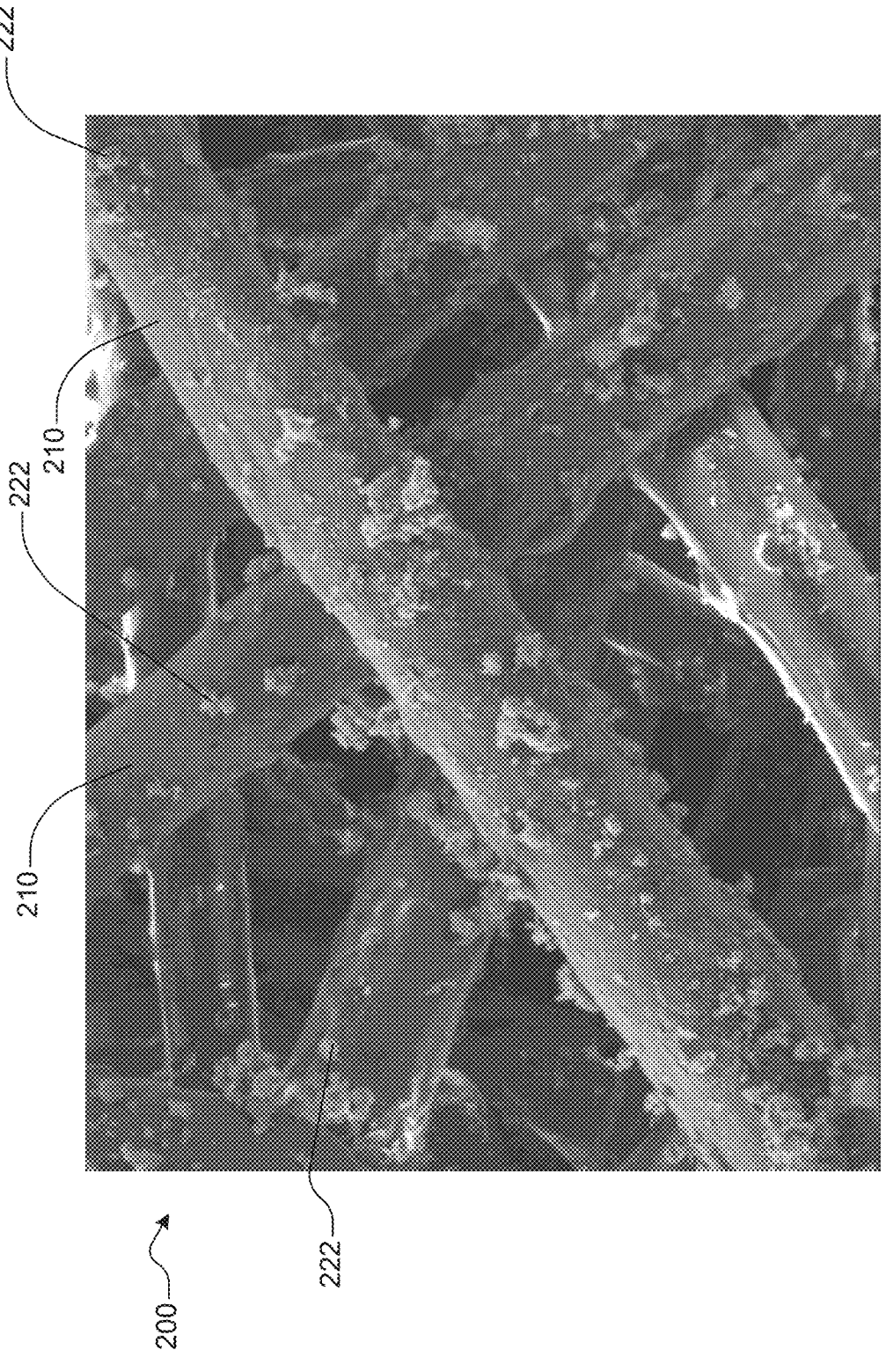
FIG. 2B is a microscopic image illustrating an example antimicrobial plastic prepared in accordance with at least one example embodiment of the present disclosure.

FIGS. 2A and 2B are a microscopic image of an example antimicrobial plastic 200 including a first layer (or section or portion) 210 comprising a plastic material, and a second layer (or section or portion) comprising a plurality of antimicrobial nanomaterials 222 disposed on the first layer 210. As illustrated, the plastic material of the first layer 210 may be in the form of a non-woven fiber that includes, for example, polypropylene fibers, polyethylene fibers, polyester fibers, polyvinyl acrylic fibers, polyethylene terephthalate fibers, and any combination thereof. In certain variations, the non-woven fiber may have an average diameter greater than or equal to about 0.2 micrometers (μm) to less than or equal to about 5,000 micrometers, and in certain aspects, optionally greater than or equal to about 20 micrometers to less than or equal to about 50 micrometers.

As illustrated, the second layer may be a discontinuous layer including the antimicrobial nanomaterials 222. For example, the antimicrobial nanomaterials 222 may cover greater than or equal to about 10 vol. % to less than or equal to about 100 vol. %, optionally greater than or equal to about 50 vol. % to less than or equal to about 100 vol. %, and in certain aspects, optionally greater than or equal to about 80 vol. % to less than or equal to about 100 vol. %, of a total surface area of each non-woven fiber 210. The antimicrobial nanomaterials 222 may include nanoparticles and/or nanocrystals having a plurality of different shapes, including rod, oval, cubic, triangular, star, needle, octahedral, hexagonal, pentagonal, flower, platelets, cluster, cylinder, and/or branched. An average particle size (D50) of the antimicrobial nanomaterials 222 defining the second layer may be greater than or equal to about 5 nanometers (nm) to less than or equal to about 400 nanometers, and in certain aspects, optionally greater than or equal to about 8 nanometers (nm) to less than or equal to about 300 nanometers. As illustrated, in certain variations, the antimicrobial nanomaterials 222 may have a general platelet shape having an aspect ratio of a major dimension to a height dimension of greater than or equal to about 13 to less than or equal to about 47, and in certain aspects, optionally about 30.

Figure 3:
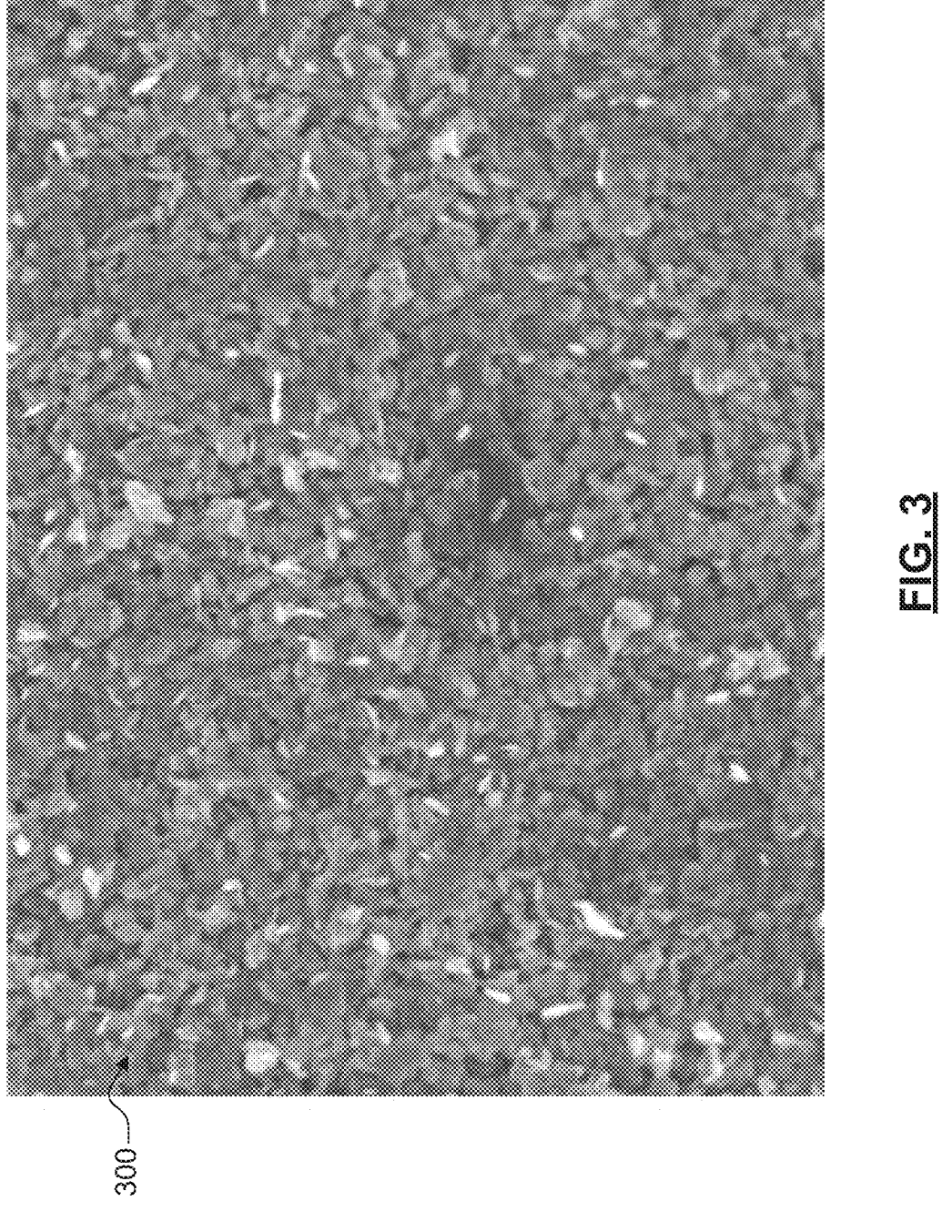
FIG. 3 is a top-down microscopic image illustrating another example antimicrobial plastic prepared in accordance with at least one example embodiment of the present disclosure.

FIG. 3 is a top-down microscopic image of an example antimicrobial plastic including an antimicrobial layer (or section or portion) 300. For example, as illustrated, the antimicrobial layer may be a substantially continuous layer covering about 100 vol. % of a total surface area of an underlaying plastic material or article. The antimicrobial layer may include a plurality of antimicrobial nanomaterials, where the antimicrobial nanomaterial particles have an average particle size (D50) greater than or equal to about 5 nanometers (nm) to less than or equal to about 400 nanometers, and in certain aspects, optionally greater than or equal to about 8 nanometers (nm) to less than or equal to about 300 nanometers.

Figure 4:
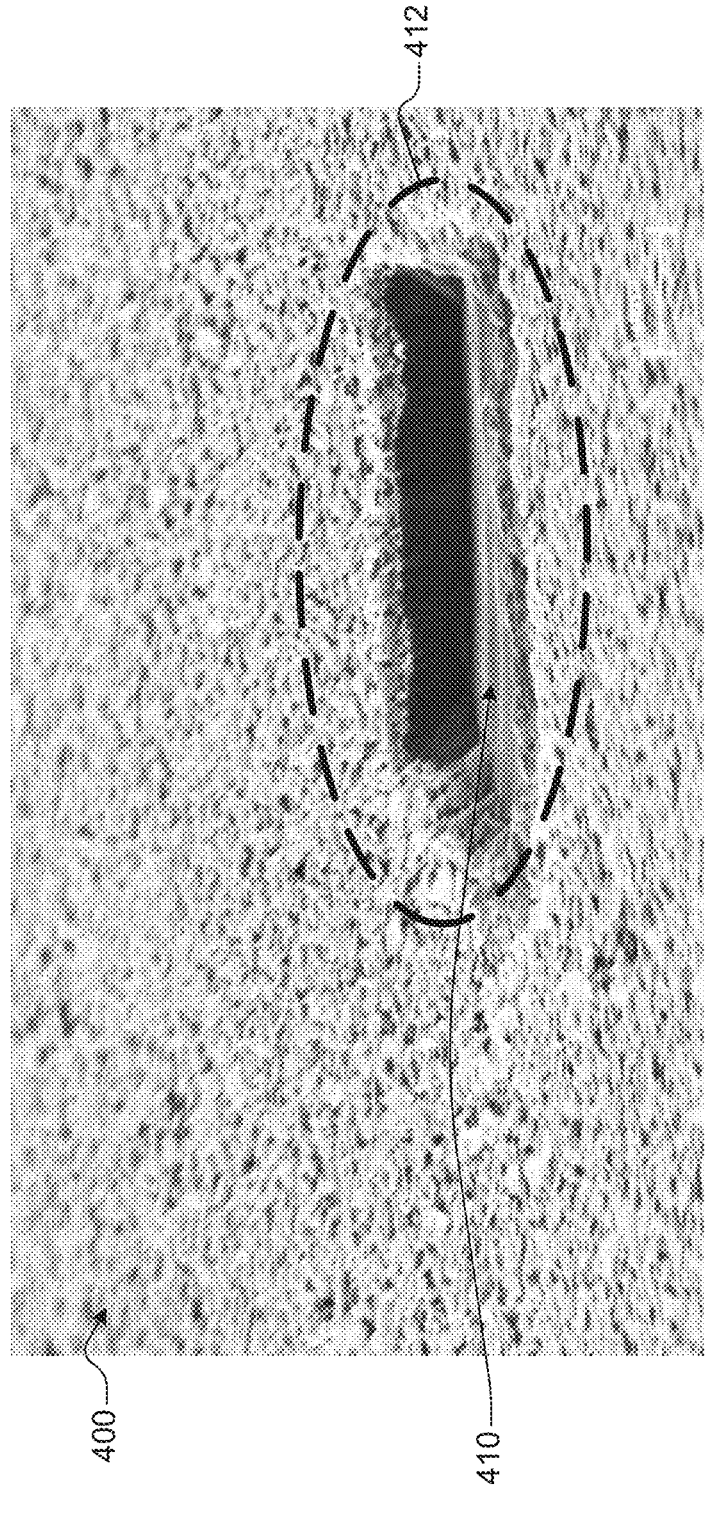
FIG. 4 is a top-down microscopic image illustrating another example antimicrobial plastic prepared in accordance with at least one example embodiment the present disclosure.

FIG. 4 is a top-down microscopic image of another example antimicrobial plastic including an antimicrobial layer (or section or portion) 400. For example, as illustrated, the antimicrobial layer may be a substantially continuous layer covering about 100 vol. % of a total surface area of an underlaying plastic material or article 410. The antimicrobial layer may include a plurality of antimicrobial nanomaterials, where the antimicrobial nanomaterial particles have an average particle size (D50) greater than or equal to about 5 nanometers (nm) to less than or equal to about 400 nanometers, and in certain aspects, optionally greater than or equal to about 8 nanometers (nm) to less than or equal to about 300 nanometers. The plastic material or article including the antimicrobial layer 400 was gashed 412 to illustrate the adhesion of the antimicrobial layer 400 to the underlaying plastic layer 410. As illustrated, the antimicrobial layer 400 has good adhesive. For example, the transferred and thermally fixed coating was not removed from the underlying surface by rubbing or washing under a water tap.

Figure 5:
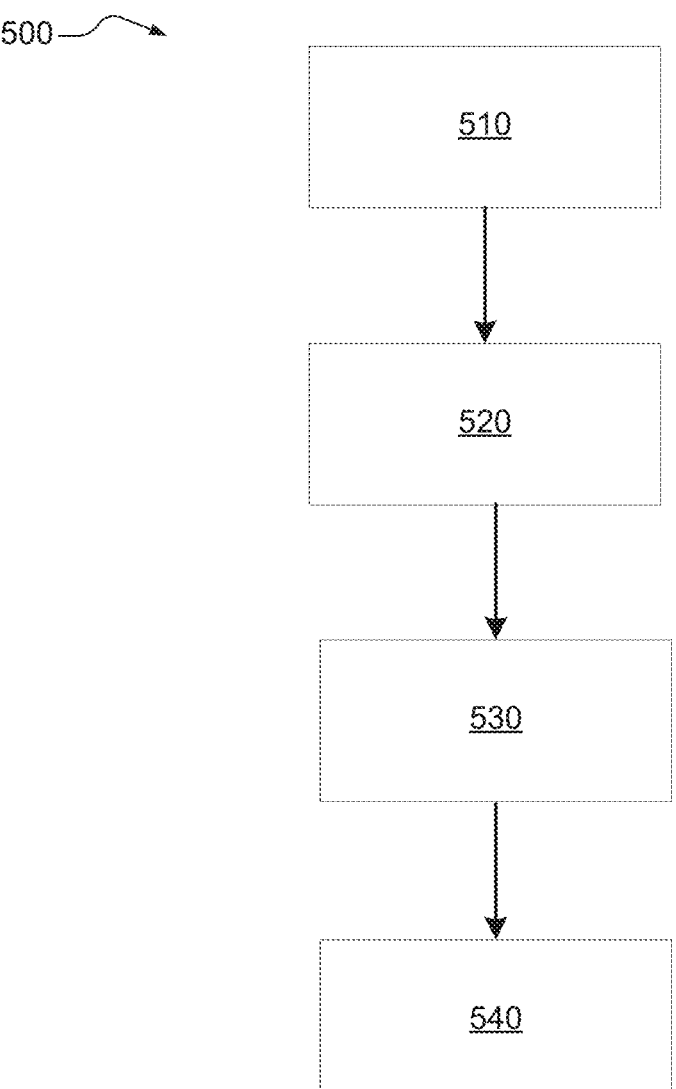
FIG. 5 is a flowchart illustrating an example method for forming antimicrobial plastics in accordance with at least one example embodiment of the present disclosure.

In various aspects, the present disclosure provides methods for preparing antimicrobial plastics, like the antimicrobial plastics 100, 200, 300, 400 illustrated in FIGS. 1-4. In at least one example embodiment, as illustrated in FIG. 5, a method 500 for preparing antimicrobial plastics may include surface treating 510 one or more surfaces of a plastic material or article and applying 520 antimicrobial nanomaterials to the treated surface. Surface treating 510 the plastic material or article may include plasma treating the one or more surface. The plasma treatment may include, for example, disposing the plastic material or article in a closed chamber and exposing the one or more surfaces of the plastic material or article to plasma light. The surface treating 510 may improve the wettability of the plastic material or article. The antimicrobial nanocrystals may be applied 520 to one or more treated surfaces of the plastic material or article using various coating techniques, including, for example, spray coating, dip coating, metallic rod coating, and/or dry coating.

In at least one example embodiment, applying 520 the antimicrobial nanomaterials to the treated surface may prepare a precursor antimicrobial layer (or section or portion), and the method 500 may further include hot pressing 540 the assembly including the plastic material or article including the precursor antimicrobial layer so that the antimicrobial nanomaterials (including, for example, micro size crystals) become embedded in the one or more surfaces of the plastic material or article to form the antimicrobial plastic. The hot pressing 540 may include applying a temperature greater than or equal to about 5° C. to less than or equal to about 100° C. above a glass transition temperature ($T_g$) for fully amorphous polymers and/or applying a temperature above a glass transition temperature ($T_g$) and about 5° C. below a melting temperature ($T_m$) for semicrystalline polymers. The hot pressing 540 may also include applying a pressure greater than or equal to about 0.5 bars to less than or equal to about 5 bars, and in certain aspects, optionally greater than or equal to about 1 bars to less than or equal to about 3 bars for both semi-crystalline and amorphous materials. The hot pressing 540 may be performed using a compression molding process.

In certain variation, the method 500 may further include drying 530 the precursor antimicrobial layer prior to the hot pressing 540. The drying 530 may include heating the precursor antimicrobial layer to a drying temperature greater than or equal to about 30° C. to less than or equal to about 100° C., and in certain aspects, optionally greater than or equal to about 50° C. to less than or equal to about 60° C. The drying temperature may be maintained for a period greater than or equal to about 5 minutes to less than or equal to about 20 minutes, and in certain aspects, optionally greater than or equal to about 8 minutes to less than or equal to about 12 minutes. Although not illustrated, it should be appreciated that, in other example embodiments, following the drying 530, the precursor antimicrobial layer may be cooled to room temperature prior to the hot pressing 540, while in other example embodiments the drying 530 temperature may be maintained.

Figure 6:
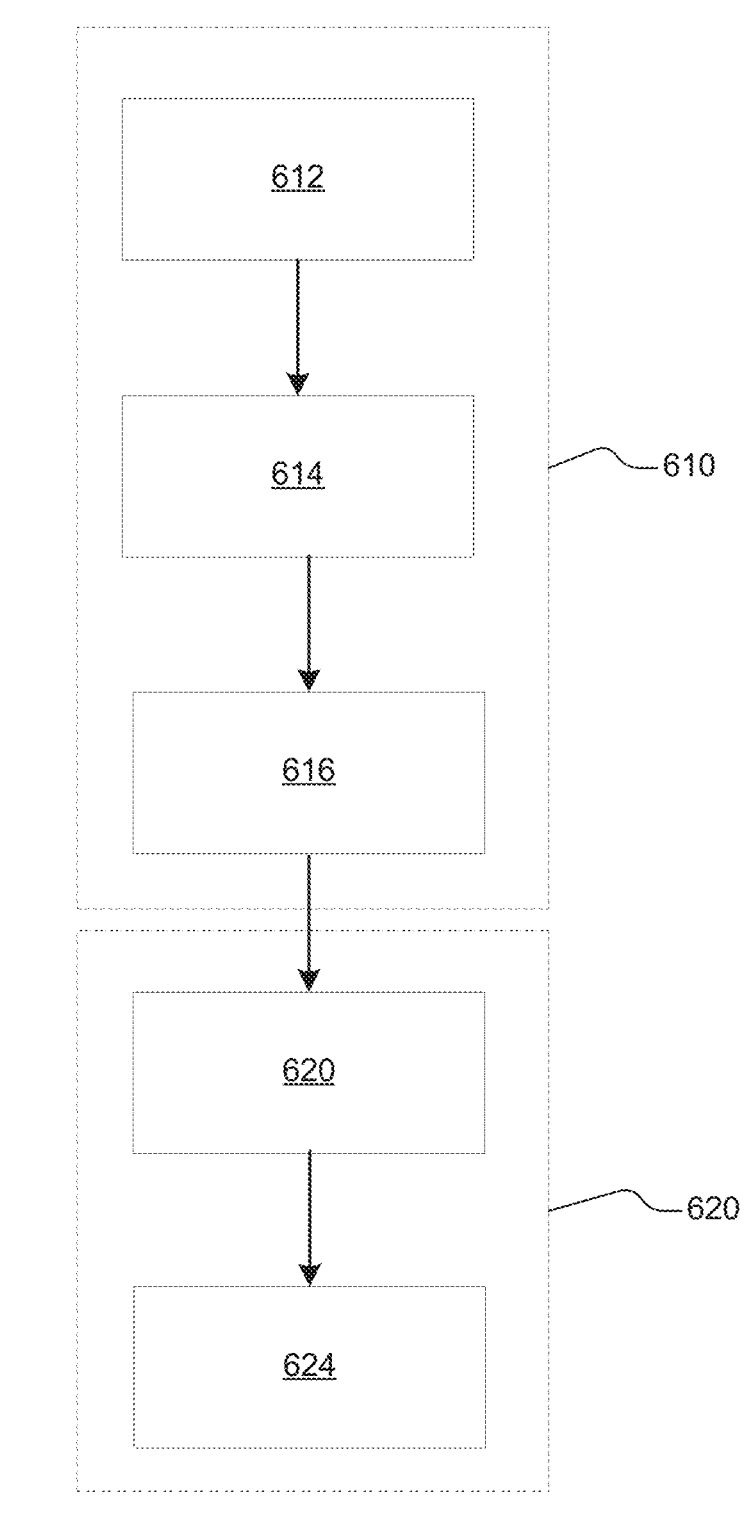
FIG. 6 is a flowchart illustrating another example method for forming antimicrobial plastics in accordance with at least one example embodiment of the present disclosure.

In other variations, antimicrobial plastics, like the antimicrobial plastics 100, 200, 300, 400 illustrated in FIGS. 1-4, may be prepared using a thermal surface-embossing method. As illustrated in FIG. 6, an example thermal surface-embossing method 600 may include preparing 610 an antimicrobial layer and transferring 620 the antimicrobial layer to a plastic material or article. In certain variations, preparing 610 the antimicrobial layer may include preparing 612 an antimicrobial slurry by contacting the antimicrobial nanomaterials to a solvent (e.g., isopropyl, ethanol, water, and the like) and disposing 614 prepared antimicrobial slurry on or near one or more surfaces of a foil to form the antimicrobial layer. The prepared antimicrobial slurry may be disposed 614 using known methods, including, for example, using a metallic rod applicator. The foil may be an aluminum foil or other metallic foil on which the antimicrobial slurry has good wettability (e.g., contact angle less than or equal to about 30 degrees). In certain variations, preparing 610 the antimicrobial layer may also include drying 616 the as-disposed antimicrobial slurry to form the antimicrobial layer. The drying 616 may include, for example, heating the as-disposed antimicrobial slurry to a drying temperature greater than or equal to about 30° C. to less than or equal to about 100° C., and in certain aspects, optionally greater than or equal to about 50° C. to less than or equal to about 60° C. The drying temperature may be maintained for a period greater than or equal to about 5 minutes to less than or equal to about 20 minutes, and in certain aspects, optionally greater than or equal to about 8 minutes to less than or equal to about 12 minutes. Although not illustrated, it should be recognized that, in other example embodiments, the method 600 may further include cooling the antimicrobial layer to ambient temperature (e.g., greater than or equal to about 18° C. to less than or equal to about 24° C.) after the drying 616 process and prior to transferring 620.

Transferring 620 the prepared antimicrobial layer to the plastic material or article may include contacting 622 the prepared antimicrobial layer and the plastic material or article and heating 624 the assembly to a transfer temperature that is above the softening temperature of the plastic material or article. For example, in at least one example embodiment, the assembly may be heated 624 to a transfer temperature greater than or equal to about 10° C. to less than or equal to about 30° C., and in certain aspects, optionally greater than or equal to about 50° C. to less than or equal to about 60° C. In at least one example embodiment, a pressure may be applied as the assembly is heated. For example, a pressure greater than or equal to about 0.5 bars to less than or equal to about 5 bars, and in certain aspects, optionally greater than or equal to about 1 bars to less than or equal to about 3 bars, may be applied at the same time as the heat 624. The transfer temperature and optionally the pressure may be maintained for a period greater than or equal to about 5 minutes to less than or equal to about 20 minutes, and in certain aspects, optionally greater than or equal to about 8 minutes to less than or equal to about 12 minutes. The antimicrobial nanomaterials are embedded or fixed within the receiving surface of the plastic material or article.

Certain features of the current technology are further illustrated in the following non-limiting examples.

EXAMPLE 1

Melt-Compounding and Injection Molding. In one example embodiment, antimicrobial biocides (including copper (II) chloride dihydrate ($CuCl_2 \cdot 2H_2O$) and magnesium hydroxide ($Mg(OH)_2$)) and polypropylene powder were physically mixed and then extrusion compounded using a co-rotating conical twin screw extruder having, for example, processing temperatures of about 210° C. at a speed of about 10 rpm for about 3 minutes. The antimicrobial biocides were incorporated into the polypropylene at a loading greater than or equal to about 1 weight percent to less than or equal to about 5 weight percent. The extrusion compounding led to polypropylene composites containing the biocidal additives at the desired level. The neat polypropylene (without biocide) and also the polypropylene-bearing biocides were injected molded into a disk shape (e.g., 25 millimeters in diameter and 1.55 millimeters in thickness), tensile, and impact specimens using a 3.5 cc injection mold. The mold temperature was fixed at about 60° C.

EXAMPLE 2

Melt-Compounding and Cast Film Extrusion. In one example embodiment, antimicrobial biocides (including copper (II) chloride dihydrate ($CuCl_2 \cdot 2H_2O$) and magnesium hydroxide ($Mg(OH)_2$)) and polypropylene powder were physically mixed and then extrusion compounded using a Leistriz Twin Screw Extruder having a screw diameter of 2.7 centimeters (cm) with a L/D ratio of 36/1. All the material was processed under the same conditions, including a processing temperature of 210° C., a speed of 10 rpm, and a residence time of 3 minutes. The compounded polypropylene-bearing biocides were then used to produce a cast film using an RCP-0625 microextruded equipped with 20.32 centimeter flex lip die. The temperature profile was set at 150/170/200/215/210/210/210° C. from feed to die and the obtained films had an average thickness of about 300 micrometers.

EXAMPLE 3

Preparation of the Antimicrobial Biocides Suspension for Thermal Embossing. About 3,330 milligrams of copper (II) chloride dihydrate ($CuCl_2 \cdot 2H_2O$) particle was combined with about 333.3 millimeters of isopropyl alcohol to prepare a $CuCl_2 \cdot 2H_2O$ particle suspension having a concentration of 10 milligrams/milliliters. The suspension was vortexed at a maximum speed for about 30 seconds and subsequently sonicated using an ultrasonic bath at about 23° C. for about 10 minutes to ensure that the $CuCl_2 \cdot 2H_2O$ particles were uniformly dispersed. After sonication, the suspension was vortexed once more at a maximum speed for about 30 seconds.

EXAMPLE 4

Preparation of the Antimicrobial Biocides Suspension for Thermal Embossing. Magnesium hydroxide ($Mg(OH)_2$) particles were obtained commercially as a slurry (e.g., 7 weight percent of $Mg(OH)_2$ and 93 wt. % of water). The $Mg(OH)_2$ slurry (e.g., 14.3 millimeters) was diluted with about 85.7 milliliters of isopropyl alcohol to prepare a $Mg(OH)_2$ suspension having a concentration of about 10 milligrams/milliliters. The suspension was vortexed at a maximum speed for about 30 seconds and subsequently sonicated in an ultrasonic bath at about 23° C. for about 10 minutes to ensure that the $Mg(OH)_2$ particles were uniformly dispersed. After sonication, the suspension was vortexed once more at a maximum speed for about 30 seconds.

EXAMPLE 5

Deposition of Antimicrobial Particles Over Aluminum Foil. A metallic rod applicator technique was used to deposit the antimicrobial biocidal suspension (see Examples 3 and 4) with a concentration of about 10 milligrams/milliliters over aluminum foil. The thickness of the wet deposited coating were greater than or equal to about 4 micrometers to less than or equal to about 120 micrometers. The thickness was controlled by adjusting the diameter of the applicator rod number. The antimicrobial suspension was spread over the aluminum foil using the metallic rod number 5 corresponding to a thickness of about 50 micrometers as a we film deposition and left to dry at about 23° C. for about 10 minutes.

EXAMPLE 6

Thermal Embossing of the Antimicrobial Biocides on Polypropylene. The coated aluminum foil with antimicrobial crystals were used to transfer the temporarily deposited particles to the surface of the polypropylene sheet prior to the thermal embossing process. The coated side of the aluminum foil was placed in contact with the polypropylene and pressed above the softening temperature of the polypropylene using a compression molding press. A temperature of about 143° C. and about 2 bars of pressure were applied for about 10 seconds. Disks were then cut having diameters of about 20 millimeters and thicknesses of about 0.5 millimeters from the polypropylene sheets of thermally embossed particles.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for preparing an antimicrobial plastic, the method comprising:
   contacting a non-leachable antimicrobial agent including magnesium hydroxide (Mg(OH)$_2$), magnesium oxide (MgO), magnesium-copper combinations, and any combination thereof to a surface of a plastic article including polypropylene (PP), linear polyethylene (PE), branched polyethylene (PE), polycarbonate (PC), polyethylene terephthalate (PET), polyvinyl chloride (PVC), polystyrene (PS), polyurethanes, polyacrylonitrile, and any combination thereof to form the antimicrobial plastic.

2. The method of claim 1, wherein the method further includes, before the contacting of the non-leachable antimicrobial agent to the surface:
   pre-treating the surface of the plastic article to improve wettability of the plastic article.

3. The method of claim 2, wherein the pre-treating of the surface of the plastic article includes a plasma treatment.

4. The method of claim 2, wherein the contacting of the non-leachable antimicrobial agent to the surface includes:
   applying a precursor antimicrobial layer to the surface of the plastic article to form a precursor assembly; and
   hot pressing the precursor assembly to embed the non-leachable antimicrobial agents within the surface of the plastic article to form the antimicrobial plastic.

5. The method of claim 4, wherein the hot pressing includes:
   applying heat at a temperature greater than or equal to about 5° C. to less than or equal to about 100° C. above a glass transition temperature of the plastic article when the plastic articles includes fully amorphous polymers; and
   applying pressure greater than or equal to about 0.5 bars to less than or equal to about 5 bars.

6. The method of claim 4, wherein the hot pressing includes:
   applying heat at a temperature above a glass transition temperature of the plastic article and about 5° C. below a melting temperature when the plastic articles includes semicrystalline polymers; and
   applying pressure greater than or equal to about 0.5 bars to less than or equal to about 5 bars.

7. The method of claim 4, wherein the method further includes:
   drying the precursor antimicrobial layer before the hot pressing, the drying including heating the precursor antimicrobial layer to a drying temperature greater than or equal to about 30° C. to less than or equal to about 100° C.

8. The method of claim 2, wherein the contacting of the non-leachable antimicrobial agent to the surface includes spray coating, dip coating, metallic rod coating, dry coating, and any combination thereof.

9. The method of claim 1, wherein the contacting of the non-leachable antimicrobial agent includes:
   preparing an antimicrobial layer including the non-leachable antimicrobial agent; and
   transferring the antimicrobial layer to the surface of the plastic article to form the antimicrobial plastic, the transferring including
      contacting the antimicrobial layer and the surface of the plastic article, and
      applying a transfer temperature that is greater than a softening temperature of the plastic article.

10. The method of claim 9, wherein the preparing of the antimicrobial layer includes:
    contacting the non-leachable antimicrobial agent to a solvent to form a slurry; and
    disposing the slurry on a surface of a foil to form the antimicrobial layer.

11. The method of claim 9, wherein the preparing of the antimicrobial layer further includes:
    drying the antimicrobial layer, the drying including heating the antimicrobial layer to a drying temperature greater than or equal to about 30° C. to less than or equal to about 100° C.

12. The method of claim 11, wherein the preparing of the antimicrobial layer further includes:
    cooling the antimicrobial layer to ambient temperature after the drying and before the transferring to the surface of the plastic article.

13. The method of claim 9, wherein the transferring further includes:
    applying a pressure greater than or equal to about 0.5 bars to less than or equal to about 5 bars.

14. The method of claim 1 wherein the non-leachable antimicrobial agent is part of a mixture, the mixture is contacted to the surface of the plastic article, and the mixture further includes a leachable antimicrobial agent, the leachable antimicrobial agent including silver (Ag), copper (Cu), copper (II) chloride dihydrate (CuCl$_2$·2H$_2$O), zinc oxide (ZnO), calcium oxide (CaO), iron (Fe), and any combination thereof.

15. A method for preparing an antimicrobial plastic, the method comprising:

applying a precursor antimicrobial layer including non-leachable antimicrobial agent to a surface of a plastic article to form a precursor assembly, the non-leachable antimicrobial agent including magnesium hydroxide ($Mg(OH)_2$), magnesium oxide (MgO), magnesium-copper combinations, and any combination thereof; and hot pressing the precursor assembly to embed the non-leachable antimicrobial agents within the surface of the plastic article to form the antimicrobial plastic.

16. The method of claim 15, wherein the method further includes:

pre-treating the surface of the plastic article to improve wettability of the plastic article.

17. The method of claim 15, wherein the precursor antimicrobial layer further includes a leachable antimicrobial agent, the leachable antimicrobial agent including silver (Ag), copper (Cu), copper (II) chloride dihydrate ($CuCl_2 \cdot 2H_2O$), zinc oxide (ZnO), calcium oxide (CaO), iron (Fe), and any combination thereof.

18. A method for preparing an antimicrobial plastic, the method comprising preparing an antimicrobial layer including a non-leachable antimicrobial agent on a foil; and transferring the antimicrobial layer from the foil to a surface of a plastic article to form the antimicrobial plastic, the transferring including contacting the antimicrobial layer and the surface of the plastic article, and applying a transfer temperature that is greater than a softening temperature of the plastic article.

19. The method of claim 18, wherein the non-leachable antimicrobial agent includes magnesium hydroxide ($Mg(OH)_2$), magnesium oxide (MgO), magnesium-copper combinations, and any combination thereof, and the antimicrobial layer further includes a leachable antimicrobial agent, the leachable antimicrobial agent including silver (Ag), copper (Cu), copper (II) chloride dihydrate ($CuCl_2 \cdot 2H_2O$), zinc oxide (ZnO), calcium oxide (CaO), iron (Fe), and any combination thereof.

* * * * *